(12) United States Patent
Katori et al.

(10) Patent No.: US 7,625,271 B2
(45) Date of Patent: Dec. 1, 2009

(54) METHOD AND SYSTEM FOR COOLING OF DRESSED CARCASSES

(75) Inventors: Yoichi Katori, Suginami-ku (JP); Satoru Nishimura, Hachinohe (JP); Hideki Takeya, Setagaya-ku (JP)

(73) Assignee: Mayekawa Mfg. Co., Ltd. (JP)

( * ) Notice: Subject to any disclaimer, the term of this patent is extended or adjusted under 35 U.S.C. 154(b) by 96 days.

(21) Appl. No.: 11/886,448

(22) PCT Filed: Dec. 15, 2005

(86) PCT No.: PCT/JP2005/023434

§ 371 (c)(1), (2), (4) Date: Oct. 26, 2007

(87) PCT Pub. No.: WO2006/098070

PCT Pub. Date: Sep. 21, 2006

(65) Prior Publication Data

US 2009/0004958 A1    Jan. 1, 2009

Related U.S. Application Data

(60) Provisional application No. 60/661,959, filed on Mar. 16, 2005.

(51) Int. Cl.
*A22B 7/00* (2006.01)

(52) U.S. Cl. ...................................................... 452/177

(58) Field of Classification Search .......... 452/177–184
See application file for complete search history.

(56) References Cited

U.S. PATENT DOCUMENTS 3,729,773 A * 5/1973 Dillon ........................ 426/524

(Continued)

FOREIGN PATENT DOCUMENTS

DE    3311437 A1    10/1984

(Continued)

OTHER PUBLICATIONS

International Search Report issued in corresponding Japanese Patent Application No. PCT/JP2005/023434, mailed Mar. 17, 2006.

*Primary Examiner*—Thomas Price
(74) *Attorney, Agent, or Firm*—Rossi, Kimms & McDowell LLP

(57) ABSTRACT

A method of cooling a dressed carcass of a slaughtered animal halved along the backbone thereof while transferring the dressed carcass in a cooling chamber is provided, with which reduction in process yield in the cooling process due to evaporation of water from the dressed carcass is suppressed to a minimum, meat juice dripping together with water does not occur when cutting the dressed carcass, the cooling period of time is reduced, energy is saved in cooling process, initial cost is reduced, and productivity is improved. The dressed carcass is cooled while transferring in the cooling chamber in a hanged attitude along the transport route T, whereby a plurality of partitioned spaces are provided in the cooling chamber 1 such that they are arranged along said transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly, and water is added to the surface of the dressed carcass while blasting cold air on to the dressed carcass in the partitioned spaces.

9 Claims, 13 Drawing Sheets
(5 of 13 Drawing Sheet(s) Filed in Color)

U.S. PATENT DOCUMENTS

| | | | |
|---|---|---|---|
| 3,748,691 A * | 7/1973 | Snowden | 452/77 |
| 4,028,774 A * | 6/1977 | Allan et al. | 62/56 |
| 4,199,958 A | 4/1980 | Masuda et al. | |
| 4,615,176 A * | 10/1986 | Tippmann | 62/62 |
| 4,621,504 A * | 11/1986 | Tippmann | 62/283 |
| 4,827,727 A * | 5/1989 | Caracciolo | 62/63 |
| 6,019,033 A * | 2/2000 | Wilson et al. | 99/470 |
| 6,266,973 B1 * | 7/2001 | Salmons | 62/416 |
| 6,551,182 B2 * | 4/2003 | Caracciolo, Jr. | 452/81 |
| 6,605,308 B2 * | 8/2003 | Shane et al. | 426/332 |
| 6,845,624 B2 * | 1/2005 | Kaminski et al. | 62/64 |
| 7,083,510 B2 * | 8/2006 | Caracciolo, Jr. | 452/81 |
| 7,128,937 B2 * | 10/2006 | van den Nieuwelaar et al. | 426/332 |
| 2004/0241295 A1 | 12/2004 | van den Nieuwelaar et al. | |

FOREIGN PATENT DOCUMENTS

| | | |
|---|---|---|
| JP | 2001061403 A | 3/2001 |
| WO | 03099028 A1 | 12/2003 |

\* cited by examiner

METHOD AND SYSTEM FOR COOLING OF DRESSED CARCASSES

This application is a U.S. National Phase Application of PCT International Application PCT/JP2005/023434 filed on Dec. 15, 2005 which is based on and claims priority from U.S. provisional application No: 60/661,959 filed on Mar. 16, 2005, the contents of which is incorporated herein in its entirety by reference.

TECHNICAL FIELD

The present invention relates to a method and system for cooling dressed carcasses of slaughtered animals halved along the backbones thereof, specifically relates to an energy-saving cooling method and system improved in productivity by or in which reduction in process yield is suppressed to a minimum, the cooling period of time is reduced, and development of meat juice dripping and bloating out of meat with water are prevented by adding water in the process of cooling.

BACKGROUND ART

Up to now in Japan when treating carcasses of slaughtered animals such as cattle, pigs, etc., operation processes of Knocking (butchering)—bloodletting—foots/corners cutting—pretreatment—skinning—cleaning—breast cutting—head cutting off—bowels removing—halving along backbone—inspection of dressed carcass—trimming—cleaning for sterilization are carried out sequentially on a processing line in a slaughterhouse, and in overseas operation processes excluding the cleaning process from the processes mentioned above are carried out sequentially on a processing line in a slaughterhouse.

Dressed carcasses processed like this are carried to a refrigerator for storage and supplied for human consumption after a considerable circulation period of time.

Temperature rises to near 40° C. in the core of a dressed carcass processed in a conventional processing line due to activity of the enzymes in the meat. Therefore, it is needed to lower the temperature of the dressed carcass as far as possible before it is carried into a refrigerator for storage. Conventionally, inner part temperature has been lowered to about 7° C. in 12~24 hours by temporal storage in a refrigerator, then severed to be shipped.

With a conventional cooling method like this, it takes a long period of time for cooling the dressed carcass and freshness is lost.

In patent literature 1 (JP-A-2001-61403) is disclosed an art with which, by blasting cold air on the surface of a dressed carcass at high speed in the processing line, heat and water is removed quickly from the surface thereof to enhance decrease in temperature of the dressed carcass processed as mentioned above, to suppress adhesion of microbes on the surface, and to preserve freshness thereof. However, with the art of patent literature 1, absolute humidity is low within the refrigerator as it is usually cooled to about 5° C., so when the carcass is carried in, ambient air around the carcass is heated by the heat of the carcass and relative humidity decreases. Therefore, water evaporates from the surface of the dressed carcass during cooling process, as a result process yield decreases by 2% or a little more.

In patent literature 2 (WO 03/099028 A1) is disclosed an art with which the cooling period of time is reduced, reduction in process yield is suppressed to 0.7~1.0%, and the quality of the meat is enhanced, by cooling with cold air and spraying cold water while transferring dressed carcasses in a hanged attitude in a tunnel.

However, with the art disclosed in patent literature 2, there is a problem that the moisture sprayed from the atomizer 6 in the tunnel 1 splashes on every side and adheres to the wall of the cooling tunnel or to the cooler for generating cold air. Adhesion of moisture to the wall of the cooling tunnel deteriorates sanitary environment. Adhesion of moisture to the evaporator, etc. of the cooler causes freezing of water thereon, which results in reduced heat transfer, as a result, defrosting operation will be frequently needed and additional power will be consumed.

Further, there is a problem that; when a good amount of moisture adheres locally, the local area sucks excessive water and bloats out, changes in color to white or becomes soft and deteriorated in quality, and there will occur meat juice dripping together with water when the dressed carcass is cut on the cutting line.

DISCLOSURE OF INVENTION

The present invention was made in light of the problems mentioned above and its object is to suppress reduction in process yield to a minimum in cooling process of dressed carcasses of slaughtered animals halved along the backbones thereof, to eliminate occurrence of dripping of meat juice when cutting the dressed carcass, to reduce the cooling period of time, to save energy in the cooling process, to reduce initial cost, and to improve productivity.

To attain the object, the present invention proposes a method of cooling a dressed carcass of a slaughtered animal halved along the backbones thereof while transferring the dressed carcass in a hanged attitude along a transport route passing through a cooling chamber maintained at a low temperature, wherein a plurality of partitioned spaces in which water is added to the surface of the dressed carcass while blasting cold air on to the dressed carcass are provided along said transport route, said partitioned spaces are arranged along said transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly, whereby water is added to the surface of the dressed carcass while blasting cold air on to the dressed carcass in the partitioned spaces.

In low temperature atmosphere in the cooling chamber, absolute humidity is always low and as the air surrounding adjacent the dressed carcass is heated by the dressed carcass and rises in temperature, relative humidity decreases near the surface thereof. Therefore, water evaporates from the body fluid adhered to the surface of the dressed carcass and the same becomes dry. When water evaporates from the surface of the dressed carcass, body fluid on the surface becomes dense than that in the inner part and meat juice oozes out toward the surface of the dressed carcass by the action of osmotic pressure which is called a dripping phenomenon.

In the method of the present invention, water is added to the surface of the dressed carcass in the partitioned spaces to prevent the occurrence of this phenomenon. By adding water to the surface of the dressed carcass, cooling velocity of the dressed carcass is enhanced by latent heat of vaporization of the water added and at the same time drying of the surface of the dressed carcass is suppressed, as a result the occurrence of dripping phenomenon can be prevented.

The amount of meat juice dripped and the cooling period of time depend on the amount of water added, on the temperature and humidity of the cooling chamber, and on the velocity of the blasted air. According to the invention, an amount of water corresponding to that evaporated from the dressed carcass in the cooling process is added intermittently to the surface of the dressed carcass in a plurality of the partitioned spaces arranged with certain distances between them in the cooling chamber. In the method of the invention, the cooling period of time is decreased and the amount of meat juice dripped is reduced by properly determining said four factors.

Further, according to the invention, as the water spreading over the surface of the dressed carcass evaporates to cool the same by depriving the same of its heat corresponding to the latent heat of vaporization of the water added, the dressed carcass is cooled effectively and meat quality is not deteriorated by cooling.

In the method of the invention, partitioned spaces are arranged along said transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly.

As the dressed carcass just after it is carried in is high in its surface temperature, evaporation speed of the water added to the surface of the dressed carcass is large. In zones like this, partitioned spaces are arranged with a relatively small distance between them to meet the large evaporation speed of the water. By this, the dressed carcass can be quickly cooled. Then, in zones where surface temperature of the dressed carcass decreases slowly, partitioned spaces are arranged with a relatively large distance between them.

By arranging the partitioned spaces as mentioned above, quick cooling of the surface of the dressed carcass is possible in the first half of the cooling process, and the slow cooling zone is formed in the latter half of the cooling process in which temperature at the core of the dressed carcass gradually reaches a prescribed temperature while its surface temperature falls slowly.

When the atmosphere in the cooling chamber is 5° C., a zone where the surface temperature reaches near 5° C. is determined to be the border zone between the quick cooling zone and slow cooling zone, and partitioned spaces are arranged along the transport route with a relatively small distance between them until the surface temperature falls to 7~8° C. to carry out quick cooling and succeeding partitioned spaces are arranged with a relatively large distance between them to form the slow cooling zone for allowing the core of the dressed carcass to be cooled gradually to a prescribed temperature.

According to the invention, water is added to the surface of the dressed carcass while blasting cold air on the dressed carcass in each of the partitioned spaces. Although the water is easier to be spread over the surface of the dressed carcass by the blasting of cold air, if the velocity of the cold air is too large, water droplets in the water spray are blown off without adhering to the surface of the dressed carcass, so the velocity of the cold air must not be so large. Further, the cold air serves to ease the adhesion of the water to the surface of the dressed carcass, and by determining the direction of the blasting of cold air, said adhesion of water is facilitated.

For example, it is suitable that water spray nozzles are provided in each of the partitioned spaces to spray water from above and side of the dressed carcass and the cold air is blasted from above and side of the dressed carcass.

According to the invention, there is an advantage that water does not fly out of the partitioned spaces, for the water is sprayed to the surface of the dressed carcass within the partitioned spaces. Therefore, it does not happen that water droplets adhere to the wall of the cooling chamber, etc., which induces sanitary problems, and that water droplets adhere to the evaporator of the cooler for producing cold air or cold water and ice up there, resulting in reduced heat transfer.

It is preferable that temperature of the water added to the dressed carcass is equal to or below dew point of the atmosphere in the cooling chamber and equal to or above 0° C. Water cooled to a temperature equal to or below dew point of the atmosphere in the cooling chamber does not evaporate when sprayed, and frosting of the evaporated water on the wall of the cooling chamber or on the cooler can be prevented.

It is preferable that an amount of water corresponding to the amount of water evaporated from the dressed carcass in the cooling process is sprayed uniformly on the surface of the dressed carcass within said partitioned spaces. As mentioned before, the air surrounding the dressed carcass adjacent thereto is heated by the dressed carcass and rises in temperature, so relative humidity decreases near the surface thereof. Body fluid is adhering to the surface of the dressed carcass, water evaporates from the body fluid, and the surface of the dressed carcass becomes dry. When water evaporates from the surface of the dressed carcass, body fluid on the surface becomes dense than that in the inner part and meat juice oozes out toward the surface of the dressed carcass by the action of osmotic pressure, which is called a dripping phenomenon.

If a large amount of water is added to the surface of the dressed carcass, the body fluid on the surface of the dressed carcass is washed away and only water remains on the surface, so the body fluid inside the dressed carcass oozes out to the surface thereof by the action of osmotic pressure. So, it is suitable to add to the surface of the dressed carcass an amount of water which corresponds to the amount of water evaporated form the dressed carcass to maintain the state as it was before the evaporation of the water. By spreading water on the surface of the dressed carcass by an amount corresponding to that evaporated, osmotic pressure does not arises and the water spreading on the surface does not permeate the dressed carcass.

It is preferable to adopt water spray nozzles of 2-fluid type as water adding means and form a thin, uniform membrane of nebulized water on the surface of the dressed carcass. When distribution of water on the surface is not even and a good amount of moisture adheres to the surface locally, the local area sucks excessive water, bloats out, changes in color to white or becomes soft, and deteriorates in quality, and there occurs meat juice dripping when cutting the dressed carcass.

It is preferable that said cooling chamber is cooled to such a temperature that the surface of the dressed carcass is not frozen and at about 0° C. The lower the temperature of the atmosphere in the cooling chamber is, the better the cooling effect, which makes quick cooling possible, but if the surface of the dressed carcass is frozen, frozen cells are destructed and meat quality is deteriorated. By maintaining atmosphere temperature in the cooling chamber above freezing point, evaporation temperature of refrigerant in the evaporator of the cooler is raised which contributes to energy-saving.

Temperature control of the cooling chamber can be done for example by controlling the fans of the coolers to blast cold air.

When the water to be added to the dressed carcass is hard water such as Ca, Mg, etc., the water is preprocessed to remove mineral salts. By this, it is prevented that the opening of the water spray nozzle is clogged by deposition of mineral salts on the surface of the opening.

The present invention proposes a system for cooling a dressed carcass of a slaughtered animal halved along the backbone thereof transferring in a cooling chamber, wherein are provided a transport route composed such that said dressed carcass is carried into said cooling chamber maintained at a low temperatures and carried out of the cooling chamber after cooled therein for a period of time needed to cool the same, a means for transferring the dressed carcass along said transport route in a state the dressed carcass is hanged by means of a hanger member, a plurality of partitioned spaces arranged along said transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly, means provided in each of said partitioned spaces for blasting cold air on to the dressed carcass, and means provided in each of said partitioned spaces for adding water to the surface of the dressed carcass.

In the system of the invention, it is necessary to provide an entrance and exit to each of the partitioned space so that the dressed carcass transferred in a hanged attitude can be carried in and out of each of the partitioned space. The entrance and exit may be openable and closable or always open by a width through which sprayed water does not fly outside of the partitioned space. Opening and closing mechanism may be for example of bellows or hinged doors.

It is suitable to use for example 2-fluid type water spray nozzles in order that water can be spread uniformly over the surface of the dressed carcass.

According to the method and system of the invention, by adding water to the surface of the dressed carcass while blasting cold air on to the dressed carcass within a plurality of partitioned spaces arranged along a transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly, the cooling period of time can be reduced and phenomenon of meat juice dripping can be suppressed. Further, evaporation of water from the surface of the dressed carcass can be suppressed and reduction in process yield can be suppressed to a minimum.

Further, by changing distance between the partitioned spaces, the cooling period of time can be properly adjusted.

Further, as water is added within the partitioned spaces, water droplets or mist can be prevented from diffusing in the cooling chamber, and decrease in productivity can be prevented, which is caused by decrease in heat transfer due to adhesion of water droplets to the coolers for producing cold water and cold air to be iced up there and by performing defrosting operation.

By maintaining the temperature of the water added to the dressed carcass to equal to or below dew point of the atmosphere in the cooling chamber and equal to or above 0° C., adhesion of water droplets to the wall of the cooling chamber or frosting on the coolers caused by evaporated water can be prevented, for the water cooled to a temperature equal to or below dew point in the cooling chamber does not evaporate when it is added to the dressed carcass.

Further, by spraying an amount of water corresponding to the amount of water evaporated from the dressed carcass in the cooling process uniformly on the surface of the dressed carcass within the partitioned spaces, a phenomenon of local bloating out of the dressed carcass and a phenomenon of dripping out of meat juice in the dressed carcass do not occur and reduction in meat quality of the dressed carcass can be prevented.

By cooling the atmosphere in the cooling chamber to such a temperature that the surface of the dressed carcass is not frozen and at about 0° C., effect of cooling the dressed carcass is increased, cells in the dressed carcass are prevented from destruction, and accordingly deterioration in meat quality is prevented, and by maintaining the cooling chamber at a temperature equal to or above dew point in the atmosphere in the chamber, evaporation temperature of refrigerant in the evaporator of the cooler is raised which contributes to energy-saving.

BRIEF DESCRIPTION OF DRAWINGS

The patent or application file contains at least one drawing executed in color. Copies of this patent or patent application publication with color drawing(s) will be provided by the Office upon request and payment of the necessary fee.

BEST MODE FOR CARRYING OUT THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 1:
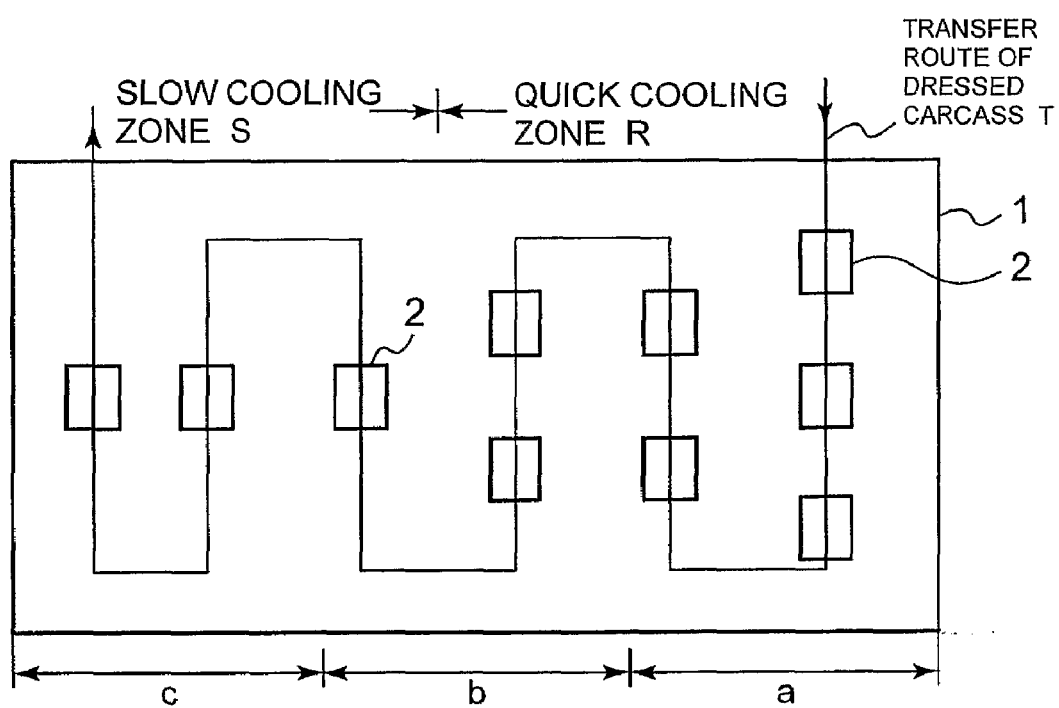
FIG. 1 is a schematic plan view of the embodiment of the dressed carcass cooling system according to the present invention showing arrangement of showering rooms.
Figure 2:
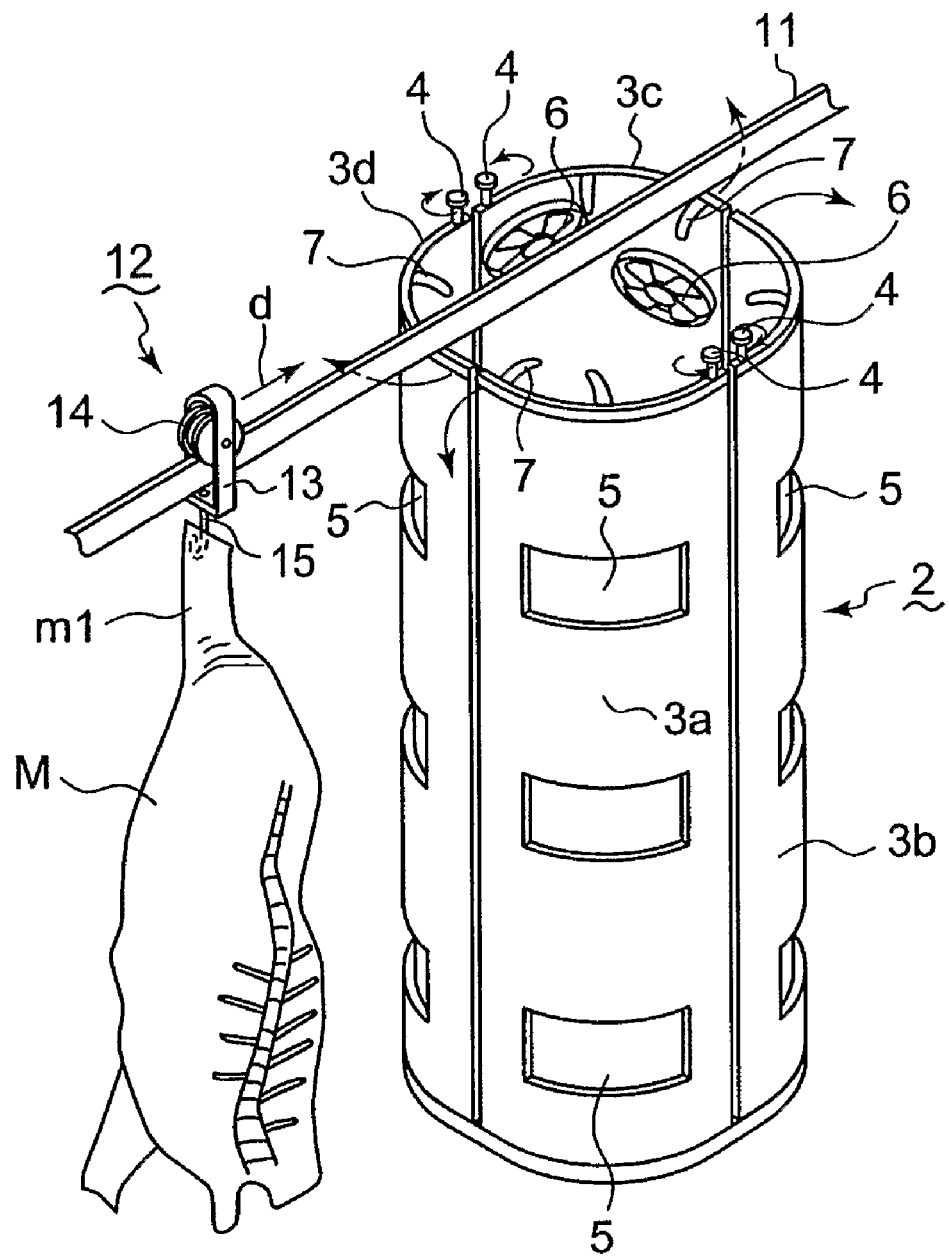
FIG. 2 is a perspective view of the showering room of the embodiment.
Figure 3:
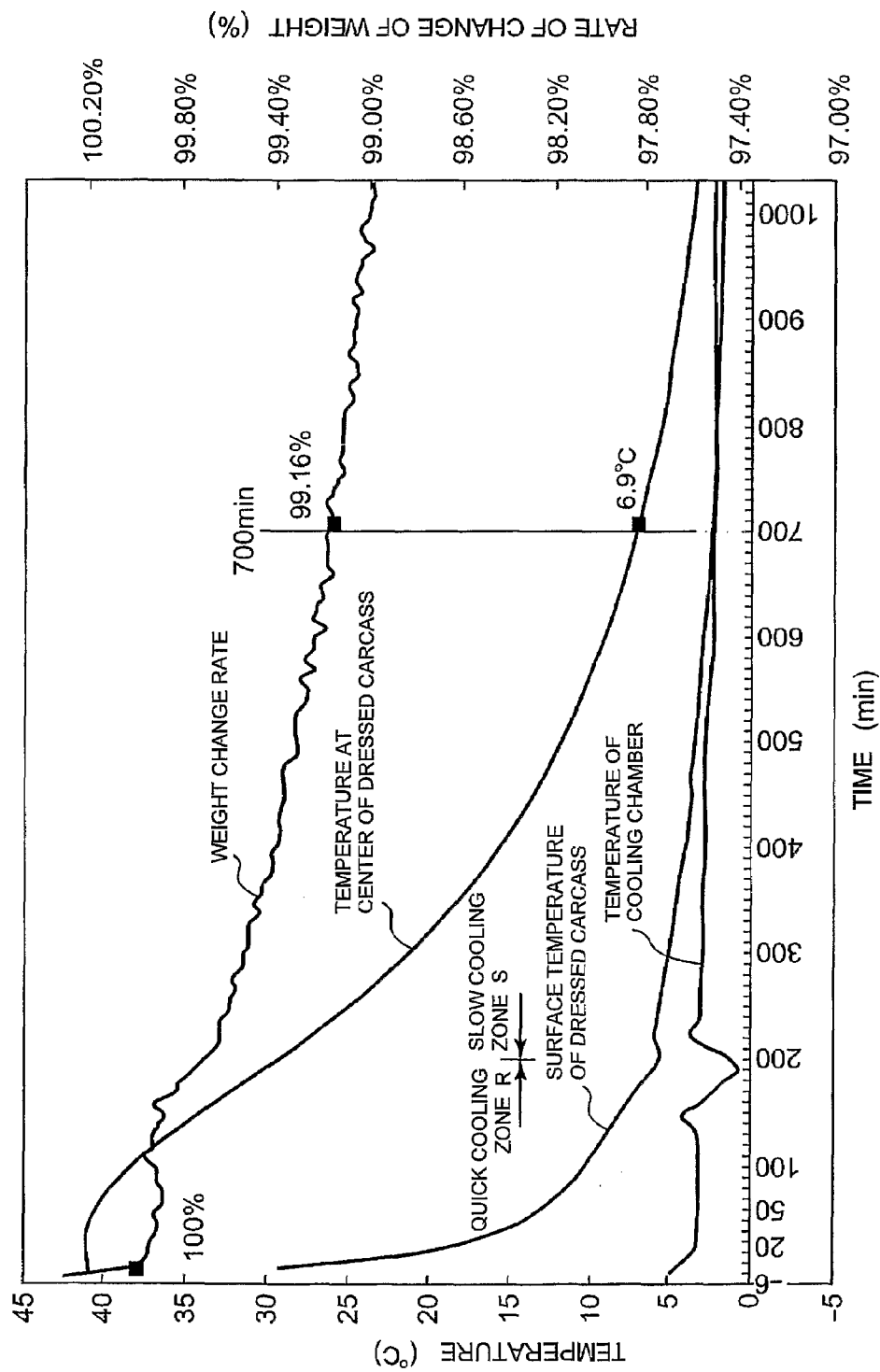
FIG. 3 is a graph showing a test result of the embodiment (test result 1 of the embodiment).
Figure 4:
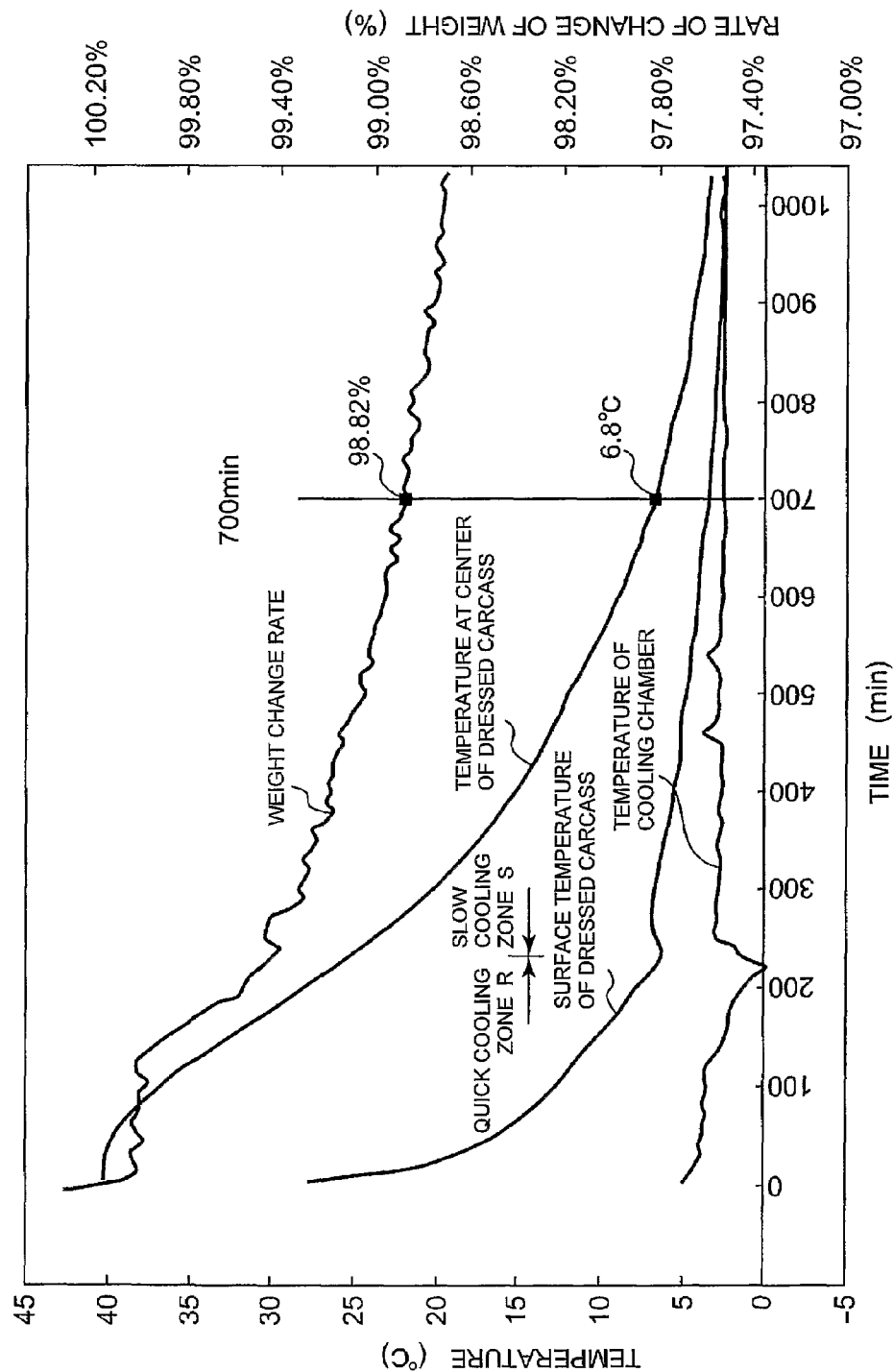
FIG. 4 is a graph showing a test result of the embodiment carried out on another condition (test result 2 of the embodiment).
Figure 6:
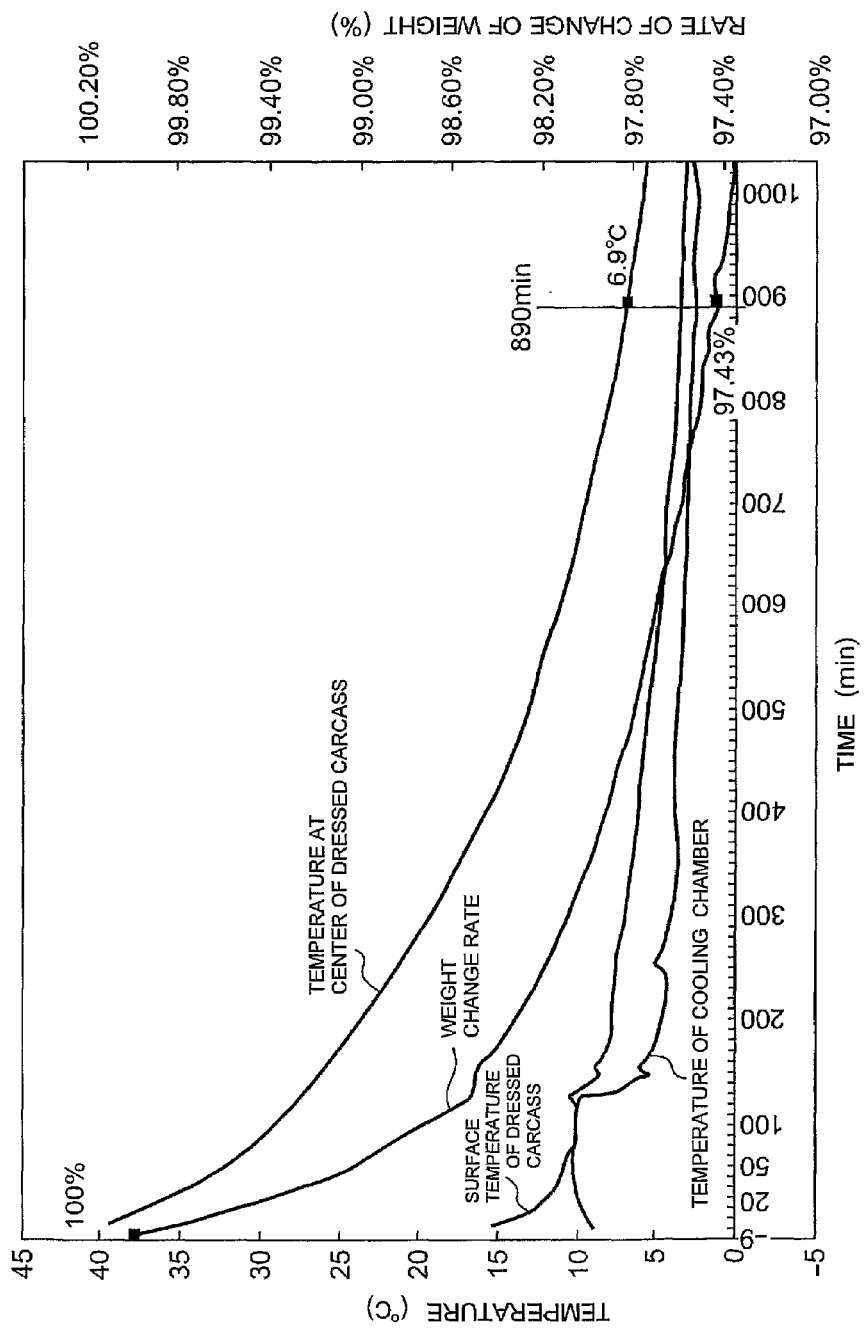
FIG. 6 is a graph showing a comparative test result 2.
Figure 7:
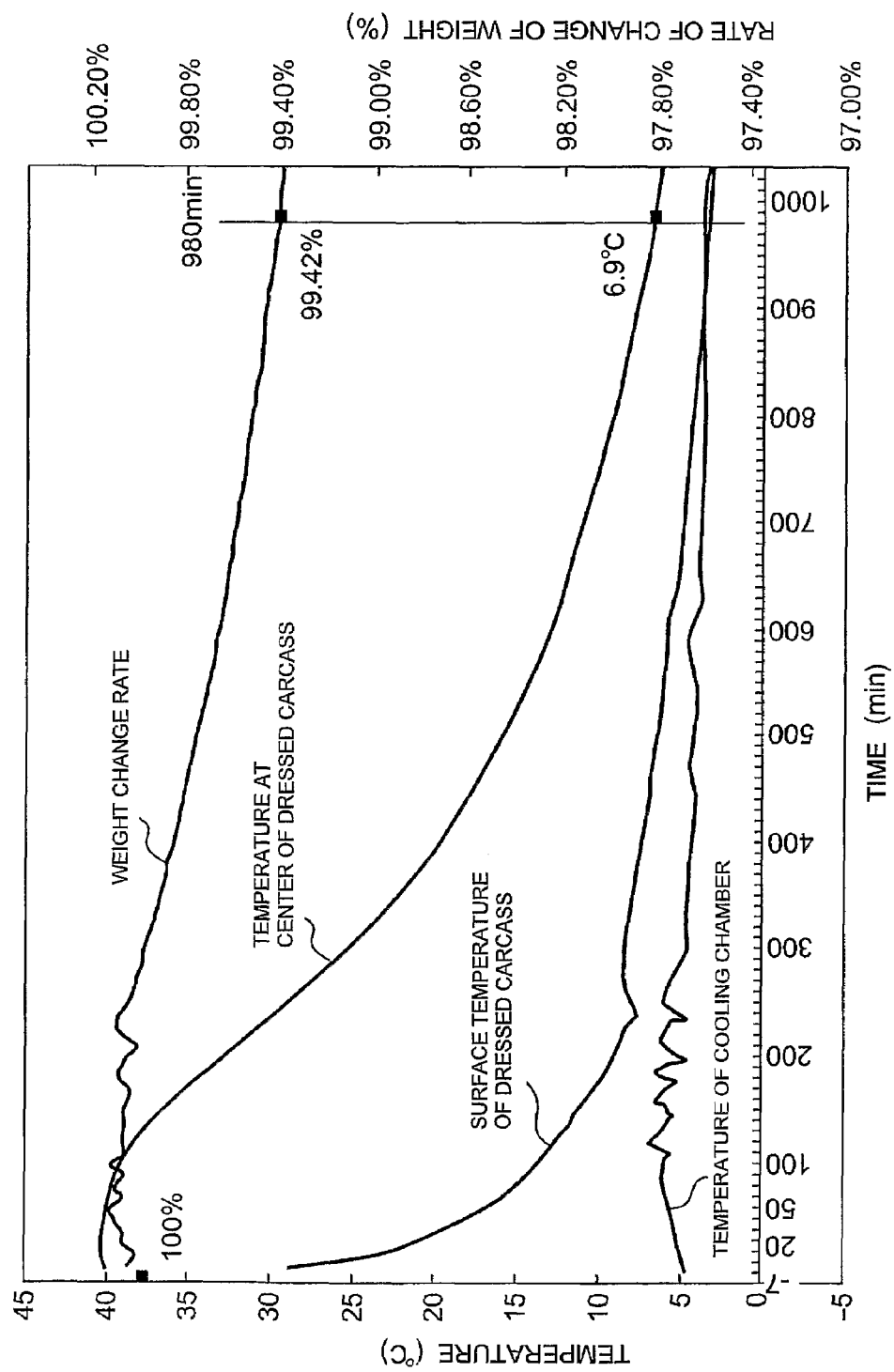
FIG. 7 is a graph showing a comparative test result 3.
Figure 8:
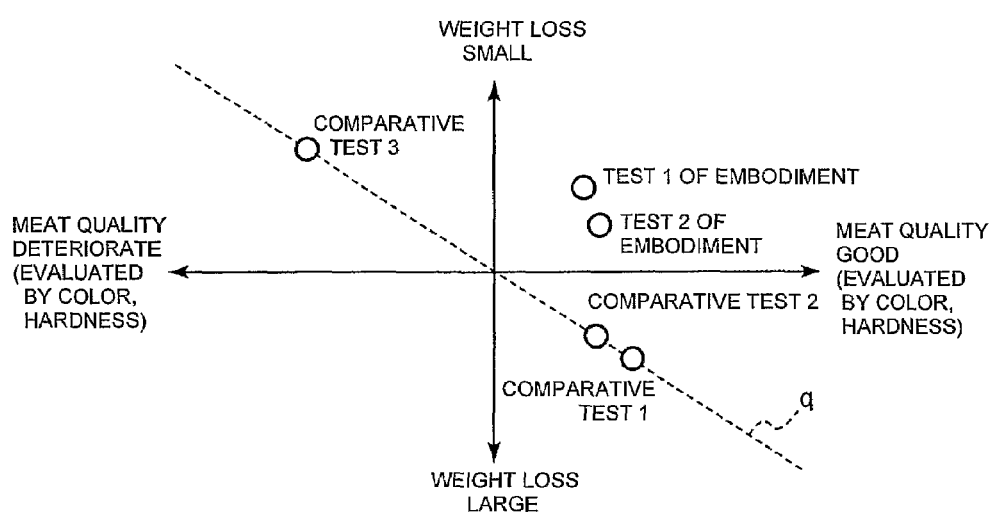
FIG. 8 is a graph showing changes in weight and quality of the dressed carcass in the test result 1 and 2 of the embodiment and in the comparative test result 1, 2, and 3.
Figure 9:
FIG. 9 is a photograph of the cooled dressed carcass of the test result 1 of the embodiment.
Figure 10:
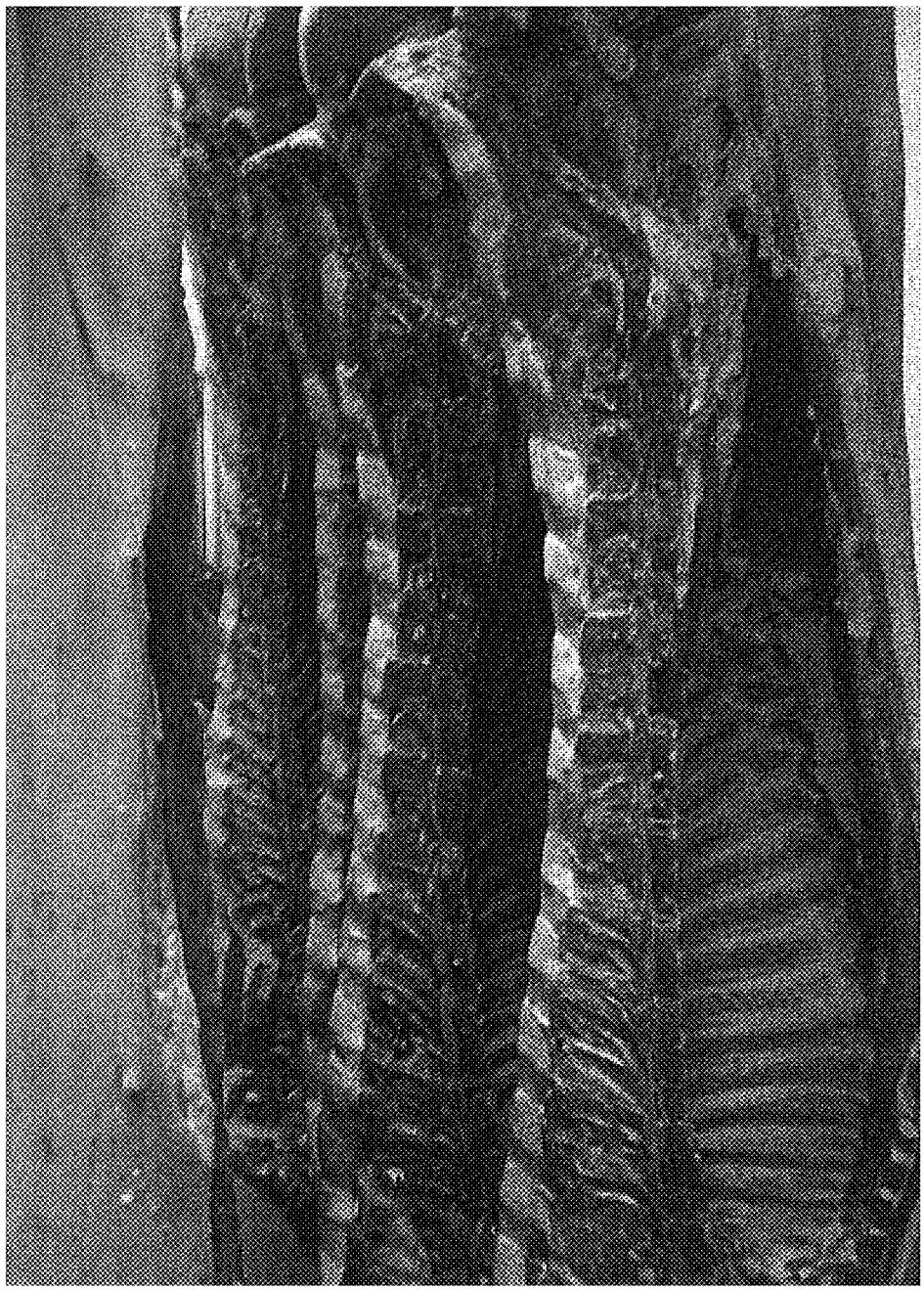
FIG. 10 is a photograph of the cooled dressed carcass of the test result 2 of the embodiment.
Figure 11:
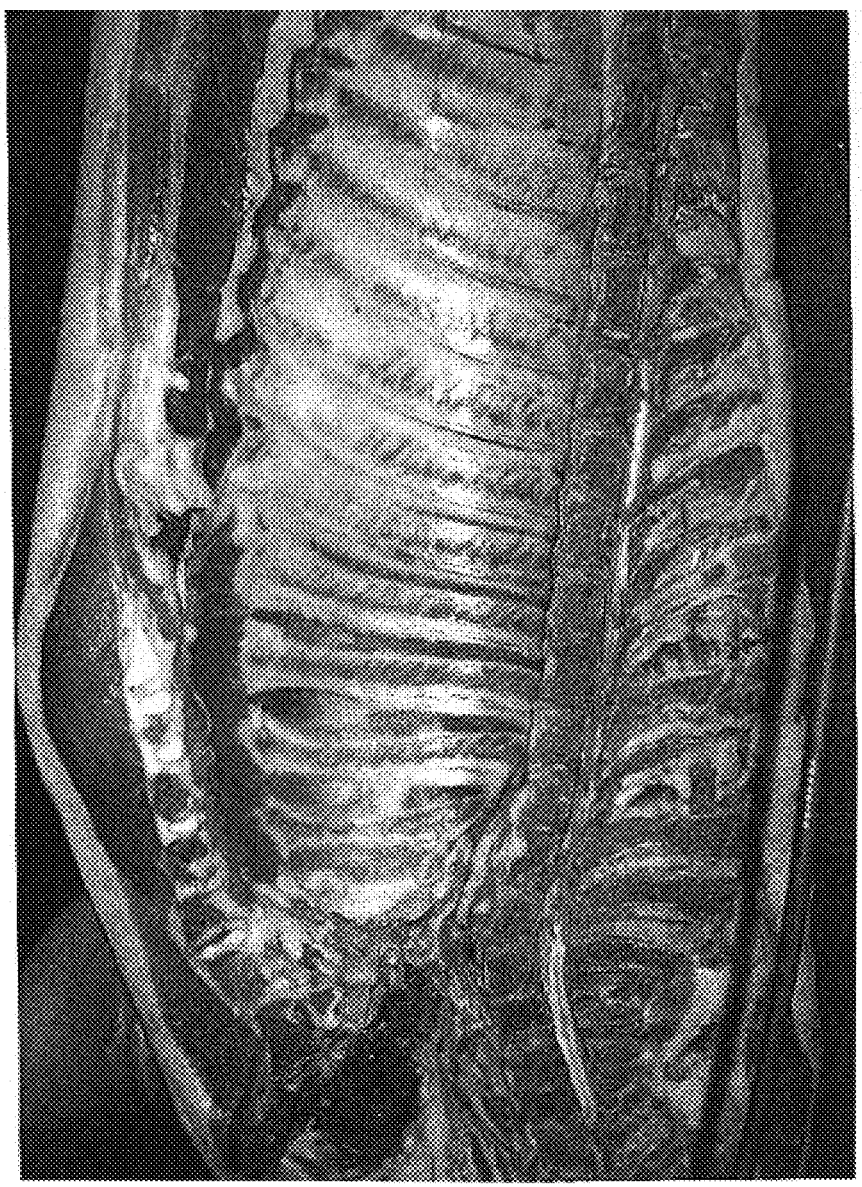
FIG. 11 is a photograph of the cooled dressed carcass of the comparative test result 1.
Figure 12:
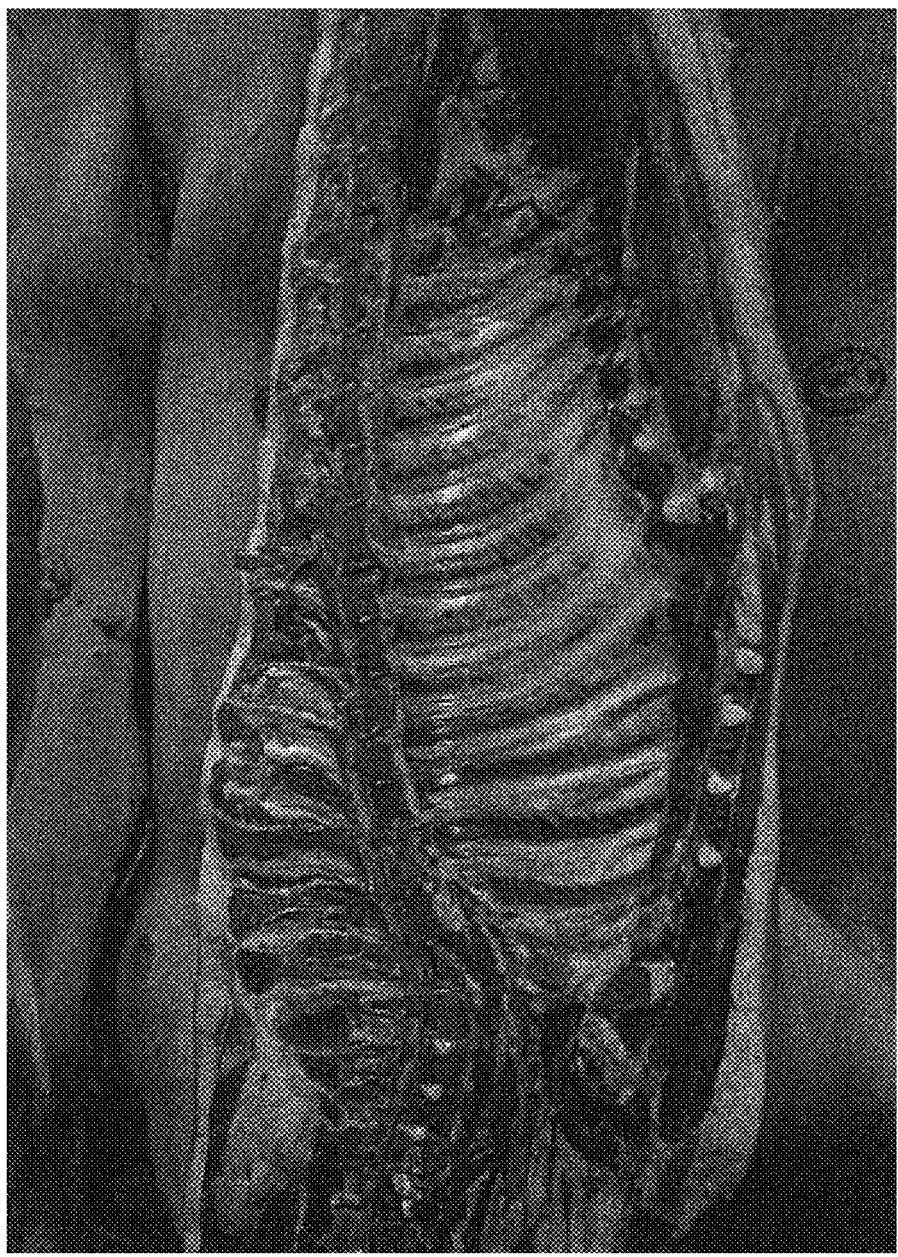
FIG. 12 is a photograph of the cooled dressed carcass of the comparative test result 2.

FIG. 1 is a schematic plan view of the embodiment of the dressed carcass cooling system according to the present invention showing arrangement of showering rooms, FIG. 2 is a perspective view of the showering room of the embodiment, FIGS. 3 and 4 are graphs showing test results of the embodiment, FIG. 4~7 are graphs each showing comparative test results, and FIG. 8 is a graph showing changes in weight and quality of the dressed carcass in the test result 1 and 2 of the embodiment and the comparative test result 1, 2, and 3.

Referring to FIG. 1, reference numeral 1 is a cooling chamber for cooling the dressed carcass M halved along the backbone thereof and cleansed for sterilization. A transport route T is formed in the cooling chamber 1 for cooling the dressed carcass while transferring along the transport route T. A plurality of showering rooms 2 are located along the transport route T at certain intervals between them.

As shown in FIG. 2, each of the showering rooms 2 is formed by enclosing with four surrounding party walls 3a, 3b, 3c, and 3d, each of which can be swung around the center of a swing shaft 4 of each wall. Reference numerals 5 are windows for monitoring.

Inside the walls are provided fans 6 for blowing cold air downward and several water spray nozzles 7 for spraying water downward at the upper part of the showering room 2. Above the showering room 2 is provided a rail 11 to form the transport route T for transferring the dressed carcass M.

Carriers 12 are mounted to the rail 11 (only one carrier is shown in the drawing), a roller 14 having a groove engaging with the rail 11 is supported rotatably to a hanger member 13 of the carrier 12, and the end of the hind shank m1 of the dressed carcass M is hanged to a hook fixed to the hanger member 13. The dressed carcass M is transferred in the direction shown by an arrow d by rotating the roller 14.

As shown in FIG. 1, showering rooms 2 are arranged with a relatively small distance between them in the quick cooling zone R in the upstream range so that the dressed carcass M of relatively high temperature just after carried into the cooling chamber 1 is cooled quickly, and the showering rooms 2 are arranged with a relatively large distance between them in the slow cooling zone S in the downstream range where surface temperature of the dressed carcass cooled quickly in the quick cooling zone R has approached the temperature of the atmosphere in the cooling chamber 1.

The temperature of the atmosphere in the cooling chamber 1 is usually maintained at about 5° C., and preferably the temperature of the cold air blown out from a cooler not shown in the drawing is maintained at +1° C. in the upstream zone a of the transport route T, at 0° C. in the intermediate zone b, and at −1° C. in downstream zone c, for example.

A cooling period of time of 3 minutes is assigned to the zone a, 5 minutes to the zone b, and 7 minutes to the zone c, for example.

The dressed carcass M is carried in from outside of the cooling chamber 1 along the transport route T. When it approaches the first showering room 2, the near side walls 3 and 3d are swung around the swing shaft 4 respectively to be opened and the dressed carcass M is introduced into the showering room 2.

When the dressed carcass M enters the showering room 2, the fans 6 begins to rotate to send cold air toward the dressed carcass M and at the same time water spray is ejected downward from a plurality of the water spray nozzles 7 located at the upper part of the showering room 2 around the inside of the party walls.

Each of the water spray nozzles 7 is for example a 2-fluid type nozzle, and fine particles of water ejected from the nozzle moisten the surface of the dressed carcass M to cool it by the latent heat of vaporization of water. The water to be sprayed from the nozzles 7 is maintained at a temperature lower than the dew-point of the atmosphere in the cooling chamber 1 and higher than 0° C., the water is sprayed intermittently in the showering room 2 so that an amount of water corresponding to that of water evaporated from the surface of the dressed carcass M in cooling process is spread uniformly on the surface of the dressed carcass M.

By maintaining the water to be sprayed at the temperature mentioned above, the water does not evaporate when it is sprayed, so the cooler not shown in the drawing and the inside surface of the wall of the cooling chamber 1 are prevented from frosting.

When the water to be sprayed to the surface of the dressed carcass is hard water, the water is pretreated to remove mineral salts such as Ca, Mg, etc. By this, it is prevented that the opening of the water spray nozzle 7 is clogged by deposition of mineral salts on the surface of the opening.

The temperature of the water to be sprayed is maintained below the dew-point of the atmosphere in the cooling chamber 1 at least in the zone a among the zones a, b, and c shown in FIG. 1. This is because the surface temperature of the dressed carcass is the highest in the zone a, and the temperature of the sprayed water is liable to rise above the dew-point influenced by the heat of the dressed carcass, which causes formation of frost on the cooler and the inside surface of the cooling chamber. The temperature of the water to be sprayed is preferably maintained below the dew-point of the atmosphere in the cooling chamber 1 also in the zone a, and b.

By allowing an amount of water corresponding to that of water evaporated from the surface of the dressed carcass M in cooling process to spread uniformly on the surface of the dressed carcass, difference in density is not developed between the inner part and surface of the dressed carcass, so permeation of water from the surface toward inner side of the dressed carcass by osmotic pressure does not occur and bloating out of meat with water is not developed and dripping of meat juice does not occur when cutting the dressed carcass.

FIG. 3 shows a result of test made by the embodiment (test result 1 of the embodiment). In this test, target cooling temperature of the core of the dressed carcass was 7° C., which was controlled by controlling the temperature of the atmosphere in the cooling chamber by adjusting the temperature of the cold air blown out from the cooler. Cold air was blasted on to the dressed carcass M from above in the showering room 2 by the fans 6 and water of +1° C. was sprayed from the water spray nozzles of 2-fluid type toward the dressed carcass M. Relative humidity was 99% in the inside of the cooling chamber outside the showering room 2.

As can be recognized from FIG. 3, surface temperature of the dressed carcass falls quickly until it approaches the temperature of the atmosphere in the cooling chamber. This quick falling in temperature occurs in the quick cooling zone R shown in FIG. 1. Then the temperature falls slowly in the slow cooling zone S shown in FIG. 1. In the embodiment, the showering rooms are arranged with a smaller distance between the rooms in the quick cooling zone R and with a larger distance between the rooms in the slow cooling zone S in order to meet cooling speed of the dressed carcass M. According to the embodiment, it took only 700 minutes (11 hours and 40 minutes), thus quick cooling was possible and process yield was 99.16%. So, it can be recognized that reduction in process yield during cooling is suppressed to a minimum.

FIG. 4 shows another result of test made by the embodiment (test result 2 of the embodiment). In this test, the water spraying period of time was decreased by 30 minutes than that in the case of test result 1 of the embodiment and other test conditions were the same. As can be recognized from FIG. 4, it took only 700 minutes (11 hours and 40 minutes), thus quick cooling was possible and process yield was 99.16%.

Figure 5:
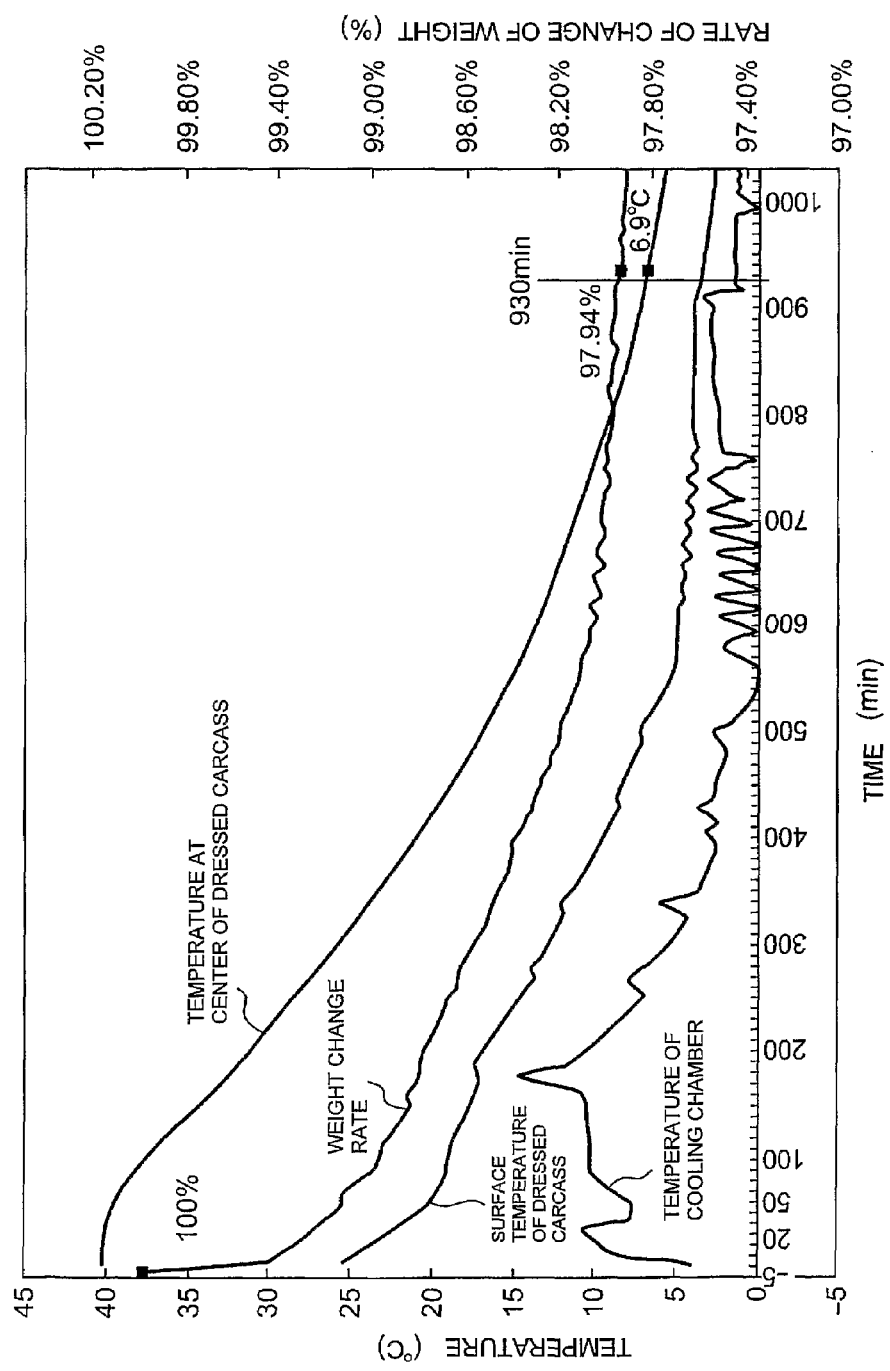
FIG. 5 is a graph showing a comparative test result 1.

FIG. 5~7 show test results of comparative examples. FIG. 5 shows the comparative test result 1 when slow cooling was done in an existing refrigerator of dressed carcass without spraying water. In this case, blasted air velocity was 0.25 m/s at the upper part, 0.5 m/s at the lower part of the dressed carcass, and average relative humidity in the cooling room was 99%. FIG. 6 shows the comparative test result 2 when cooling for dehumidification was done at initial stage for 1 hour and 50 minutes and then cooling to maintain coldness was done without spraying water. In this case, blasted air velocity was 5 m/s during the cooling for dehumidification and 0.1 m/s during the cooling for maintaining coldness at the upper part of the dressed carcass, and average relative humidity in the cooling room was 83%. FIG. 7 shows the comparative test result 3 when water was sprayed continuously for 3 hours of initial cooling, then cooling for maintaining coldness was done. In this case, blasted air velocity was 5 m/s during continuous spray of water and 0.1 m/s during cooling for maintaining coldness at the upper part of the dressed carcass, and average relative humidity in the cooling room was 99%.

FIG. 8 is a graph showing changes in weight and quality of the dressed carcass in the test result 1 and 2 of the embodiment and in the comparative test result 1, 2, and 3, and FIG. 9~13 are photographs of the cooled dressed carcass of the test result 1, 2 of the embodiment and those of comparative test results 1~3.

As can be recognized from FIG. 3~8, the test result 1 of the embodiment shows that the period of time to cool the dressed carcass until the temperature at its core arrives at 6.9° C. is the shortest and its process yield is 99.16% which means reduction in process yield is suppressed to 0.9% without deterioration in meat quality.

On the other hand, the comparative test result 1 and 2 show a longer period of time to cool the dressed carcass until the temperature at its core arrives at 6.9° C., and their process yields decreased in the 97% range. In the case of the comparative test result 3, decrease in process yield is the smallest, but deterioration in meat quality is admitted.

In the evaluation of meat quality, 'that the dressed carcass is red' does not necessarily mean that the meat quality is good.

Figure 13:
FIG. 13 is a photograph of the cooled dressed carcass of the comparative test result 3.

For example, although the dressed carcass of the comparative result 3 of FIG. 13 exhibits red color and has the appearance of freshness, meat quality is deteriorated. In the case of a dressed carcass, relative evaluation was done in FIG. 8 such that, 'red' is not necessarily good, rather 'moderate pink plus moderate softness' is evaluated as good in quality and plotted in the right side range in the graph, 'appreciably red' as medium, and 'whitish' or 'darkish' as deteriorated and plotted in the left side range in the graph.

In FIG. 8 in which the ordinate represents weight reduction and abscissa represents meat quality, the comparative examples 1~3 without spraying of water and the comparative example with excess spraying of water are all on a straight line q descending rightward in accordance with the amount of water sprayed. On the other hand, the example 1 and 2 of the embodiment are in the upper right range, which shows that weight reduction is smaller than and meat quality is superior to those of the comparative examples.

INDUSTRIAL APPLICABILITY

According to the present invention, reduction in process yield can be suppressed to a minimum, the cooling period of time can be reduced, development of meat juice dripping and bloating out of meat with water are prevented, and productivity can be improved without deterioration of meat quality (judged by color and hardness) while saving energy by adding water intermittently to the surface of the dressed carcass of a slaughtered animal halved along the backbone thereof.

The invention claimed is:

1. A method of cooling a dressed carcass of a slaughtered animal halved along the backbone thereof while transferring the dressed carcass in a hanged attitude along a transport route passing through a cooling chamber maintained at a low temperature, the method comprising:
   moving the dressed carcass through a plurality of partitioned spaces provided along the transport route;
   adding water to the surface of the dressed carcass as the dressed carcass is moved through the plurality of partitioned spaces; and
   blasting cold air on to the dressed carcass as the water is added to the surface of the dressed carcass,
   wherein enhanced cooling of the dressed carcass is provided through vaporization of the added water; and
   wherein said partitioned spaces are arranged along said transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly.

2. A method of cooling a dressed carcass according to claim 1, wherein said cooling chamber is cooled to such a temperature that the surface of the dressed carcass is not frozen and at about 0° C.

3. A method of cooling a dressed carcass according to claim 1, wherein an amount of water corresponding to the amount of water evaporated from the dressed carcass in the cooling process is sprayed uniformly on the surface of the dressed carcass within said partitioned spaces.

4. A method of cooling a dressed carcass according to claim 1, wherein temperature of the water added to the dressed carcass is equal to or below dew point of the atmosphere in the cooling chamber and equal to or above 0° C.

5. A method of cooling a dressed carcass according to claim 1, wherein when the water to be added to the dressed carcass is hard water the water is preprocessed to remove mineral salts.

6. A system for cooling a dressed carcass of a slaughtered animal halved along the backbone thereof, the system comprising:
   a cooling chamber;
   a transport route provided in said cooling chamber such that said dressed carcass is carried in said cooling chamber maintained at a low temperature and carried out of the cooling chamber after cooled therein for a period of time needed to cool the same;
   a hanger member that transports the dressed carcass along said transport route in a state that the dressed carcass is hanged by the hanger member,
   a plurality of partitioned spaces arranged along said transport route with a relatively small distance between them in a zone where the surface of the dressed carcass is cooled quickly and with a relatively large distance between them in a zone where surface temperature of the dressed carcass has approached the temperature of the cooling chamber and the dressed carcass is cooled slowly;
   a water supply device that adds water to the surface of the dressed carcass in each of said partitioned spaces; and
   a fan that blasts cold air on to the dressed carcass, as water is added to the dressed carcass by the water supply device, in order to enhance cooling of the dressed carcass through vaporization of the added water in each of said partitioned spaces.

7. A system for cooling a dressed carcass according to claim 6, wherein the water supply device comprises at least one water spray nozzle.

8. A system for cooling a dressed carcass according to claim 7, wherein each of said partitioned spaces comprises a showering room that includes party walls to enclose the dressed carcass as the dressed carcass is being carried along the transport path in the cooling chamber, each showering room being open upwardly, and said party walls are constructed such that party walls facing said transport route can be opened and closed.

9. A system for cooling a dress carcass according to claim 8, wherein the water spray nozzle and the fan are provided as part of the showering room.

* * * * *